(12) United States Patent
Yagyu et al.

(10) Patent No.: US 12,323,037 B2
(45) Date of Patent: Jun. 3, 2025

(54) ROTATING ELECTRICAL MACHINE

(71) Applicant: KUBOTA CORPORATION, Osaka (JP)

(72) Inventors: Sumio Yagyu, Osaka (JP); Minoru Hiraoka, Osaka (JP)

(73) Assignee: KUBOTA CORPORATION, Osaka (JP)

(*) Notice: Subject to any disclaimer, the term of this patent is extended or adjusted under 35 U.S.C. 154(b) by 246 days.

(21) Appl. No.: 18/121,661

(22) Filed: Mar. 15, 2023

(65) Prior Publication Data

US 2023/0223817 A1 Jul. 13, 2023

Related U.S. Application Data

(63) Continuation of application No. PCT/JP2021/033528, filed on Sep. 13, 2021.

(30) Foreign Application Priority Data

Sep. 25, 2020 (JP) ................................. 2020-161103

(51) Int. Cl.
*H02K 7/11* (2006.01)
*H02K 7/08* (2006.01)
(Continued)

(52) U.S. Cl.
CPC ............. *H02K 7/116* (2013.01); *H02K 7/088* (2013.01); *H02K 21/14* (2013.01)

(58) Field of Classification Search
CPC ...... B60K 2006/262; B60K 2006/4825; B60K 2006/4833; B60K 6/26; B60K 6/365;
(Continued)

(56) References Cited

U.S. PATENT DOCUMENTS

2018/0328413 A1* 11/2018 Yagyu ...................... F16D 3/52
2019/0063589 A1*  2/2019 Pydin .................. F16H 57/0479
2021/0194313 A1*  6/2021 Kanada .................. H02K 5/203

FOREIGN PATENT DOCUMENTS

CN      105743279 A      7/2016
CN      113644783 A   * 11/2021
(Continued)

OTHER PUBLICATIONS

Supplementary European Search Report dated Mar. 13, 2024 in corresponding European family member Patent Application No. 21872236.1.

(Continued)

*Primary Examiner* — Naishadh N Desai
(74) *Attorney, Agent, or Firm* — Greenblum & Bernstein, P.L.C.

(57) ABSTRACT

A rotating electrical machine includes a stator, a rotor located radially inward of the stator and being rotatable, and an input member including an input shaft through which rotation power is inputted into the rotor, wherein the input member includes an internally toothed gear portion to rotate as the input shaft rotates, and the rotor includes first external teeth to mesh with the internally toothed gear portion. The rotating electrical machine preferably includes an output member including an output shaft through which rotation power is outputted from the rotor, the input member preferably includes an externally toothed gear portion to rotate as the input shaft rotates, and the output member includes second external teeth to mesh with the externally toothed gear portion.

7 Claims, 8 Drawing Sheets

(51) Int. Cl.
   *H02K 7/116*    (2006.01)
   *H02K 21/14*    (2006.01)
(58) Field of Classification Search
   CPC . B60K 6/48; F16H 1/10; H02K 21/14; H02K 7/003; H02K 7/086; H02K 7/088
   See application file for complete search history.

(56) References Cited

FOREIGN PATENT DOCUMENTS

| EP | 2946959 A2 | * | 11/2015 | ............ B60K 17/04 |
|---|---|---|---|---|
| EP | 3392071 A1 | | 10/2018 | |
| GB | 728804 A | * | 10/1953 | |
| JP | 2004-122925 A | | 4/2004 | |
| JP | 2007-107717 A | | 4/2007 | |
| JP | 2007-283892 A | | 11/2007 | |
| JP | 2017-040352 A | | 2/2017 | |
| JP | 2017-105382 A | | 6/2017 | |
| JP | 2019-039551 A | | 3/2019 | |

OTHER PUBLICATIONS

International Search Report issued Nov. 30, 2020 in international application No. PCT/JP2021/033528 and English translation thereof.
Written Opinion issued Nov. 30, 2020 in international application No. PCT/JP2021/033528 and English translation thereof.

* cited by examiner

ROTATING ELECTRICAL MACHINE

CROSS REFERENCE TO RELATED APPLICATIONS

This application is a continuation application of International Application No. PCT/JP2021/033528, filed on Sep. 13, 2021, which claims the benefit of priority to Japanese Patent Application No. 2020-161103, filed on Sep. 25, 2020. The entire contents of this application are hereby incorporated herein by reference.

BACKGROUND OF THE INVENTION

1. Field of the Invention

The present invention relates to rotating electrical machines such as a motor, a generator, and a motor/generator.

2. Description of the Related Art

A hybrid power transmission mechanism using a rotating electrical machine disclosed in Japanese Unexamined Patent Application Publication No. 2017-105382 is known. This power transmission mechanism is a parallel hybrid power transmission mechanism that has a structure in which an engine, a rotating electrical machine (a motor/generator), and a driven device are connected in this order.

SUMMARY OF THE INVENTION

In the above-described power transmission mechanism using a rotating electrical machine, the devices thereof are usually connected directly to each other. Therefore, the devices of the power transmission mechanism rotate at the same rotation speed. For this reason, the rotation speed of the rotating electrical machine is the same as the rotation speed of the engine, leaving room for improvement in efficiency in consideration of the amount of electric current, etc. One method to make the rotating electrical machine rotate at a higher rotation speed than the engine would be to use, for example, a structure in which the devices are connected via gear(s), instead of direct connection. However, when a structure using gear(s) is used, the use of planet gear(s) would make the structure complex and the use of multistage gear(s) would make the structure large in size.

Preferred embodiments of the present invention provide a rotating electrical machine that achieves compactness and high efficiency with a simple structure.

Technical solutions provided by the present invention in order to solve the above issues include the following feature (s).

A rotating electrical machine includes: a stator; a rotor located radially inward of the stator and being rotatable; and an input member including an input shaft through which rotation power is inputted into the rotor, wherein the input member includes an internally toothed gear portion to rotate as the input shaft rotates, and the rotor includes first external teeth to mesh with the internally toothed gear portion.

The rotating electrical machine may further include an output member including an output shaft through which rotation power is outputted from the rotor. The input member may include an externally toothed gear portion to rotate as the input shaft rotates. The output member may include second external teeth to mesh with the externally toothed gear portion.

The first external teeth, the second external teeth, and the externally toothed gear portion may be located radially inward of the internally toothed gear portion.

The rotor may include a base portion having a disc shape, a boss portion including the first external teeth, and an outer annular portion located radially outward of the boss portion. The boss portion and the outer annular portion may protrude from the base portion toward the input shaft. The internally toothed gear portion may be located between the boss portion and the outer annular portion.

The input member may include the input shaft and a power transmission portion. The power transmission portion may include a substrate, an outer protruding portion, and a central protruding portion. One end portion of the input shaft may be connected to a center of the substrate. The outer protruding portion may have a cylindrical shape and extends from a peripheral portion of the substrate toward the rotor. The internally toothed gear portion may be located radially inward of the outer protruding portion. The central protruding portion may extend from the center of the substrate toward the rotor. The externally toothed gear portion may be provided radially outward of the central protruding portion. The outer protruding portion and the boss portion may be arranged in a nested manner. The outer annular portion and the outer protruding portion may be arranged in a nested manner.

The output shaft may extend through the rotor.

A direction in which an axis of the input shaft extends may be not on the same axis as a direction in which an axis of the output shaft extends, but may be parallel to the direction in which the axis of the output shaft extends.

The rotating electrical machine may further include a bearing to support the rotor rotatably. The bearing may support an inner circumferential surface of the outer annular portion.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
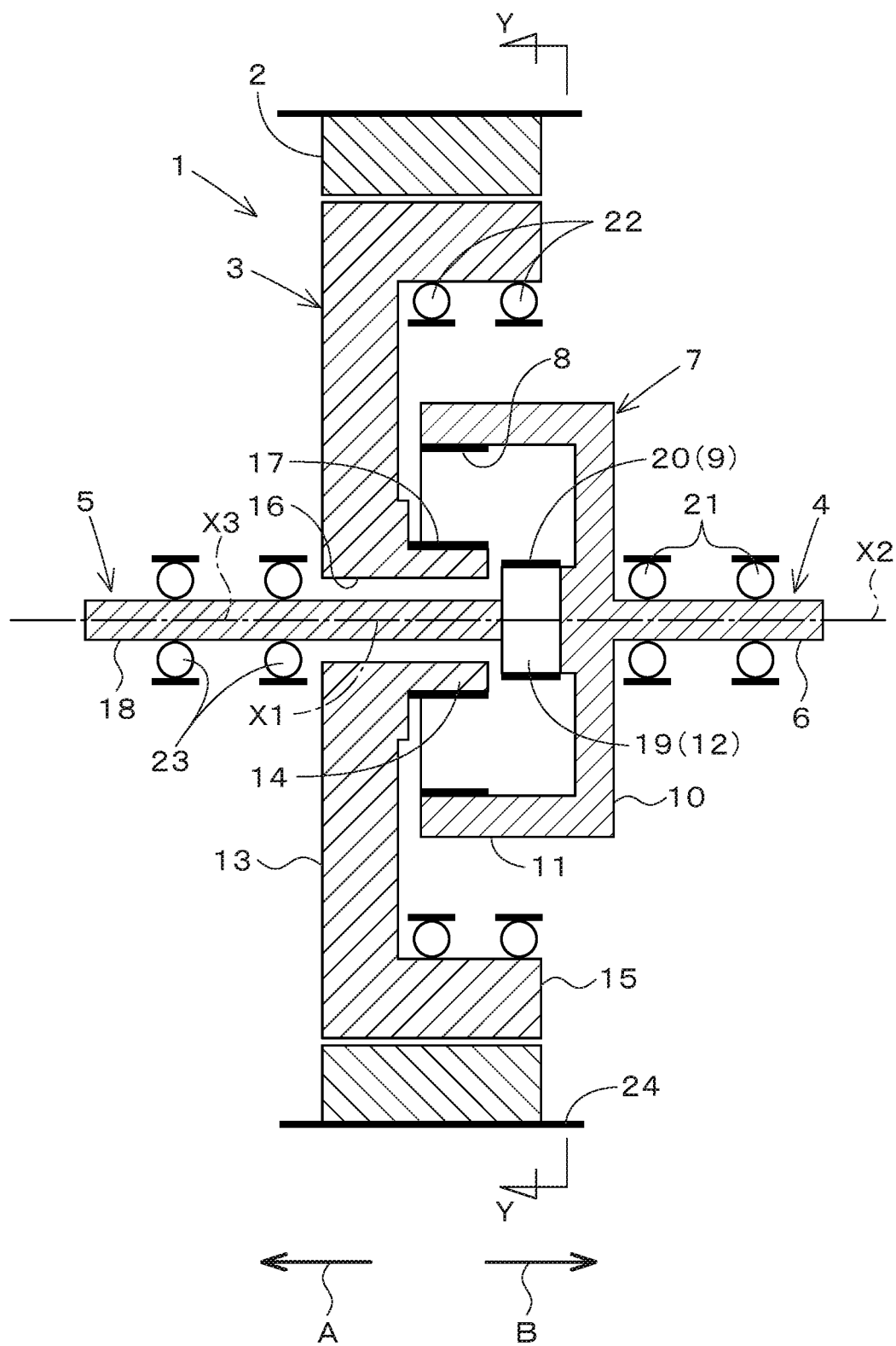
FIG. 1 is a cross-sectional view of an embodiment of a rotating electrical machine according to the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of a rotating electrical machine 1 according to the present invention will now be explained while referring to the drawings. The rotating electrical machine 1 is a motor, a generator, a motor/generator, or the like.

Figure 2:
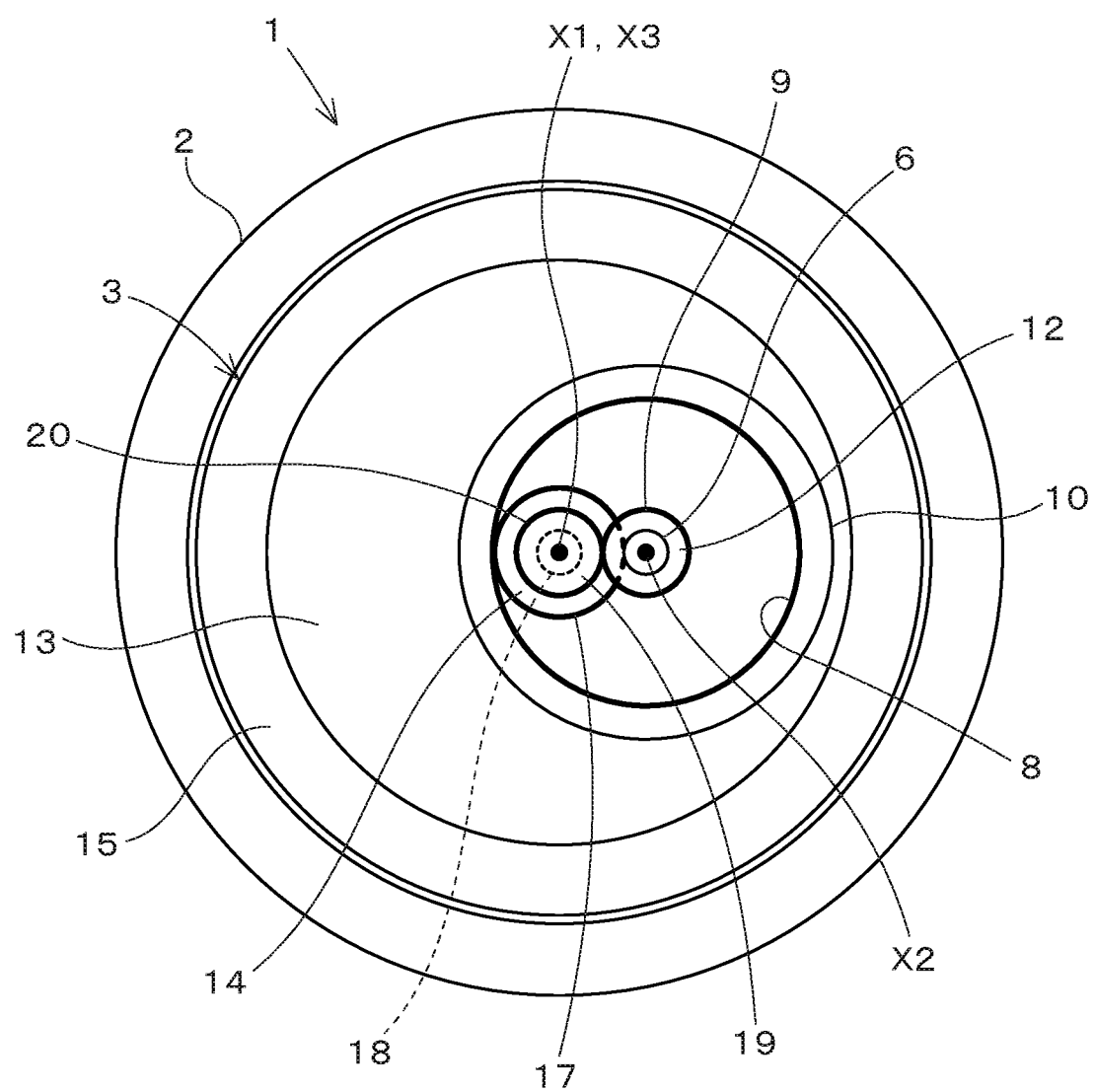
FIG. 2 is a cross-sectional view taken along Y-Y of FIG. 1, in which meshing between an internally toothed gear portion, an externally toothed gear portion, a first external teeth, and a second external teeth is illustrated.

An embodiment of the rotating electrical machine 1 according to the present invention is illustrated in FIGS. 1 and 2.

The rotating electrical machine 1 includes a stator 2, a rotor 3, an input member 4, and an output member 5. The rotating electrical machine 1 is housed inside a container 24 such as, for example, a transmission case or a motor casing.

The stator 2 has a tubular shape (cylindrical shape) and is housed inside the container 24 in a non-rotatable manner. The stator 2 includes, for example, a stator core and coil(s). The rotor 3 is located radially inward of the stator 2 and is rotatable. The rotor 3 includes, for example, a rotor core and permanent magnet(s).

To facilitate an explanation, the direction indicated by arrow A in FIG. 1 will be hereinafter referred to as forward, and the direction indicated by arrow B in FIG. 1 will be hereinafter referred to as rearward. An axis about which the rotor 3 rotates (such an axis is hereinafter referred to as a rotation axis X1) extends in a front-rear direction.

The input member 4 includes an input shaft 6 and a power transmission portion 7.

The input shaft 6 is a shaft through which rotation power is inputted into the rotor 3. The input shaft 6 extends in the front-rear direction. The input shaft 6 is rotatable about an axis X2. The axis X2 of the input shaft 6 deviates from the direction in which the rotation axis X1 of the rotor 3 extends, and does not coincide with the rotation axis X1 (see FIG. 2). More particularly, the axis X2 of the input shaft 6 is not on the same axis as the direction in which the rotation axis X1 of the rotor 3 extends, but extends in parallel to the rotation axis X1. The outer circumferential surface of the input shaft 6 is supported by a first bearing 21. The first bearing 21 supports the input member 4 such that the input member 4 is rotatable about the axis X2.

The power transmission portion 7 is a portion via which power is transmitted between the input shaft 6 and other members (the rotor 3, the output member 5). The power transmission portion 7 includes an internally toothed gear portion 8 and an externally toothed gear portion 9. The power transmission portion 7 is integral with the input shaft 6. Therefore, the internally toothed gear portion 8 and the externally toothed gear portion 9, which are included in the power transmission portion 7, rotate around the axis X2 as the input shaft 6 rotates.

The power transmission portion 7 includes a substrate 10, an outer protruding portion 11, and a central protruding portion 12. The substrate 10 in the form of a disc. One end portion of the input shaft 6 is connected to the center of the substrate 10. The input shaft 6 extends from the center of the substrate 10 in a direction away from the rotor 3 (extends rearward). The outer protruding portion 11 has a cylindrical shape and extends from a peripheral portion of the substrate 10 toward the rotor 3 (extends forward). The internally toothed gear portion 8 is provided radially inward of the outer protruding portion 11. The central protruding portion 12 extends from the center of the substrate 10 toward the rotor 3 (extends forward). The externally toothed gear portion 9 is provided radially outward of the central protruding portion 12. The central protruding portion 12 is located radially inward of the outer protruding portion 11. The externally toothed gear portion 9 is located radially inward of the internally toothed gear portion 8. Note that the central protruding portion 12 and the externally toothed gear portion 9 are not illustrated in FIG. 1, because they are hidden by a gear portion 19 and second external teeth 20 (which will be described later). The central protruding portion 12 and the externally toothed gear portion 9 are located behind the gear portion 19 and the second external teeth 20 as viewed from a viewer of FIG. 1.

As illustrated in FIG. 1, the degree of protrusion of the outer protruding portion 11 from the substrate 10 is larger than the degree of protrusion of the central protruding portion 12 from the substrate 10. Therefore, the externally toothed gear portion 9 and the internally toothed gear portion 8 are displaced from each other in the direction of the axis X2 of the input shaft 6. Specifically, the internally toothed gear portion 8 is located forward of the externally toothed gear portion 9 along the direction of the axis X2 of the input shaft 6.

The rotor 3 includes a base portion 13, a boss portion 14, and an outer annular portion 15.

The base portion 13 is in the form of a disc. The boss portion 14 has a cylindrical shape and protrudes from the center of the base portion 13 toward the input shaft 6 (protrudes rearward). The rotor 3 has a through hole 16. The through hole 16 passes through the boss portion 14 and the base portion 13 in the front-rear direction. The center of the through hole 16 is located on the rotation axis X1 of the rotor 3. The rotor 3 includes first external teeth 17 to mesh with the internally toothed gear portion 8. The first external teeth 17 are provided on the outer circumferential surface of the boss portion 14. That is, an externally toothed gear including the first external teeth 17 is provided on the outer circumferential surface of the boss portion 14. The first external teeth 17 are located radially inward of the internally toothed gear portion 8.

The outer annular portion 15 is a cylindrical portion located radially outward of the boss portion 14. The outer annular portion 15 extends from a peripheral portion of the base portion 13 toward the input shaft 6 (extends rearward). The outer circumferential surface of the outer annular portion 15 is located near and opposite the inner circumferential surface of the stator 2. The inner circumferential surface of the outer annular portion 15 is supported by a second bearing 22. The second bearing 22 supports the rotor 3 such that the rotor 3 is rotatable about the rotation axis X1. The second bearing 22 is located between the outer annular portion 15 and the power transmission portion 7. In other words, the second bearing 22 is located radially inward of the outer annular portion 15 and radially outward of the power transmission portion 7. The internally toothed gear portion 8 is located between the boss portion 14 and the outer annular portion 15. That is, the boss portion 14 is located radially inward of the internally toothed gear portion 8, and the outer annular portion 15 is located radially outward of the internally toothed gear portion 8.

As illustrated in FIG. 1, the outer annular portion 15, the boss portion 14, and the outer protruding portion 11 overlap with one another in the front-rear direction. Therefore, the outer protruding portion 11 and the boss portion 14 are arranged in a nested manner, and the outer annular portion 15 and the outer protruding portion 11 are arranged in a nested manner.

The output member 5 includes an output shaft 18 and the gear portion 19. The output shaft 18 is a shaft through which rotation power is outputted from the rotor 3. The output shaft 18 is rotatable about an axis X3. The output shaft 18 extends in the front-rear direction. The axis X3 of the output shaft 18 is on the same axis as the direction in which the rotation axis X1 of the rotor 3 extends. The output shaft 18 passes through the rotor 3. More particularly, the output shaft 18 is inserted through the through hole 16 in the rotor 3. There is a gap between the outer circumferential surface of the output shaft 18 and the inner circumferential surface of the through hole 16.

The gear portion 19 is provided on one end portion (rear end portion) of the output shaft 18. The output shaft 18 extends from the gear portion 19 in a direction away from the input shaft 6 (extends forward). The gear portion 19 includes the second external teeth 20 to mesh with the externally toothed gear portion 9. The second external teeth 20 are located radially inward of the internally toothed gear portion 8. The direction in which the axis X3 of the output shaft 18 extends is not on the same axis as the direction in which the axis X2 of the input shaft 6 extends, but is parallel to the direction in which the axis X2 extends. The outer circumferential surface of the output shaft 18 is supported by a third bearing 23. The third bearing 23 supports the output member 5 including the output shaft 18 such that the output member 5 is rotatable about the axis X3.

The rotating electrical machine 1 according to the embodiment described above includes the input shaft 6 (the input member 4) and the output shaft 18 (the output member 5). However, the rotating electrical machine 1 according to the present invention may have a structure including the input shaft 6 (the input member 4) but not including the output shaft 18 (the output member 5) (see FIG. 8). The rotating electrical machine 1 not including the output shaft 18 can be used as a generator. The rotating electrical machine 1 not including the output shaft 18 will be described in detail later.

The rotating electrical machine 1 can be placed inside a transmission case or a motor casing. With this, it is possible to supply, to the rotating electrical machine 1, transmission oil or hydraulic fluid supplied to the inside of the transmission case or the motor casing. This makes it possible to lubricate gears (the externally toothed gear portion 9, the internally toothed gear portion 8, the first external teeth 17, and the second external teeth 20) of the rotating electrical machine 1 and cool the rotating electrical machine 1 using the transmission oil or the hydraulic fluid supplied to the inside of the transmission case or the motor casing. This makes it unnecessary to provide separate structure(s) to lubricate and/or cool the rotating electrical machine 1 independently of a structure for supplying the transmission oil or the hydraulic fluid.

Figure 3:
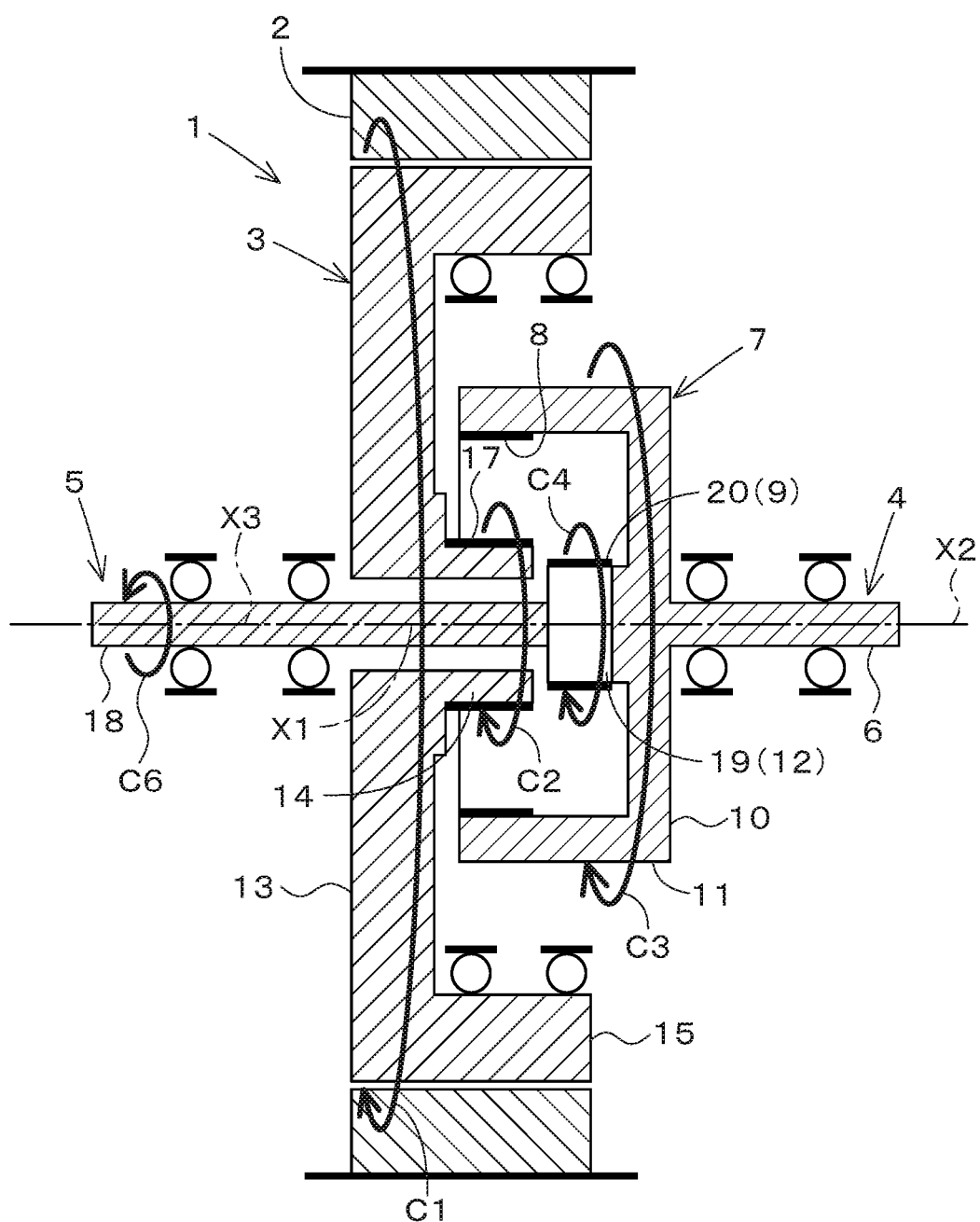
FIG. 3 is a diagram illustrating operation performed in a case where the rotating electrical machine functions as a motor.
Figure 4:
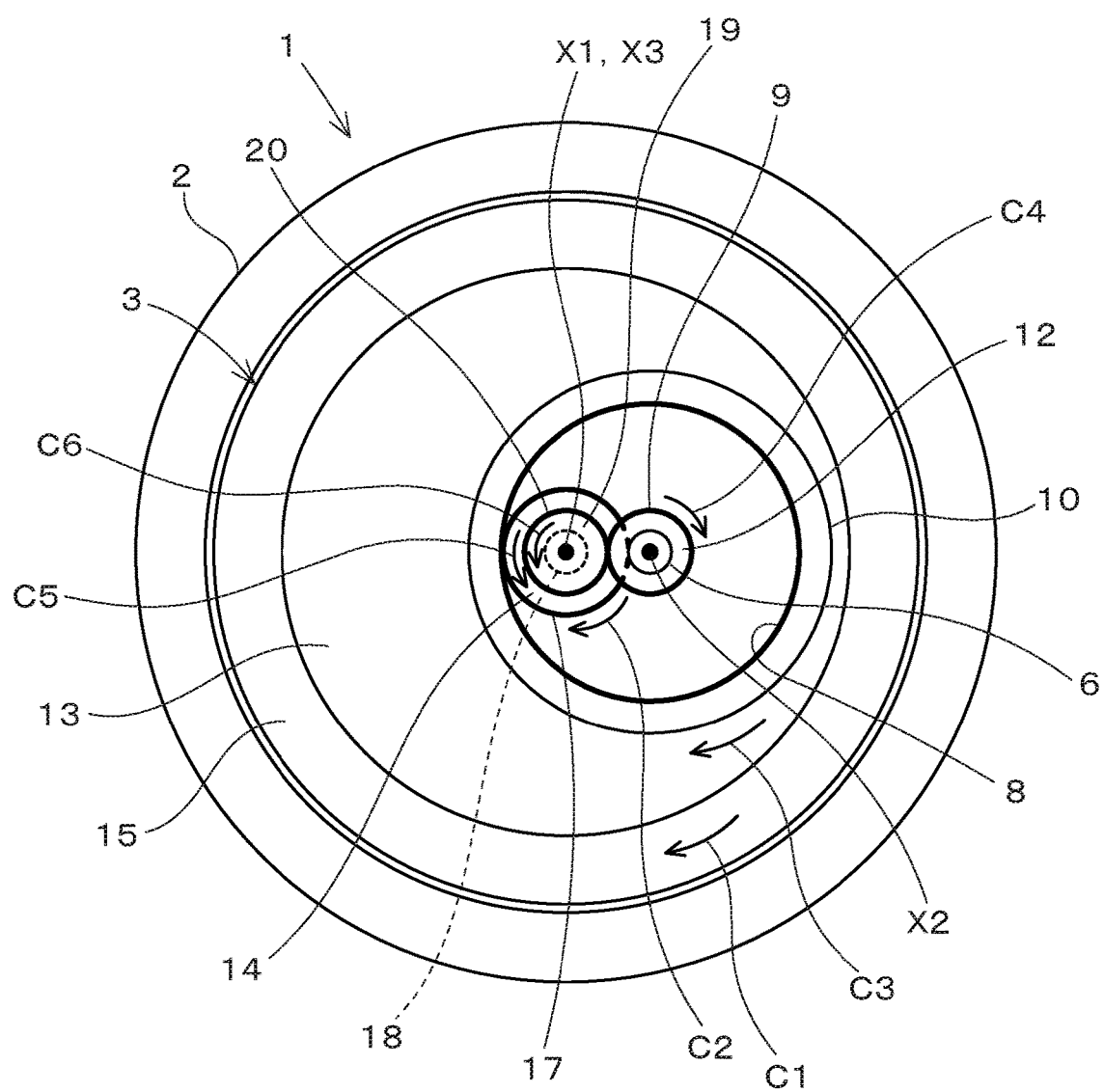
FIG. 4 illustrates operation performed in a case where the rotating electrical machine functions as a motor.

The rotating electrical machine 1 functions as a motor in which the rotor 3 rotates about the rotation axis X1, when electric current is passed through the coil(s) of the stator 2. In this case, the rotation power of the rotor 3 is taken out through the output shaft 18. As illustrated in FIGS. 3 and 4, when the rotor 3 rotates about the rotation axis X1 (see arrow C1), the boss portion 14 also rotates (see arrow C2), and the internally toothed gear portion 8 meshing with the first external teeth 17 on the boss portion 14 rotates (see arrow C3). As the internally toothed gear portion 8 rotates, the input member 4 rotates, and therefore the externally toothed gear portion 9 also rotates (see arrow C4). As the externally toothed gear portion 9 rotates, the second external teeth 20 meshing with the externally toothed gear portion 9 rotates (see arrow C5), and the output shaft 18 rotates (see arrow C6). The output shaft 18 is connected to driven device(s) such as hydraulic pump(s). The driven device(s) is/are driven by the rotation of the output shaft 18. Thus, the rotating electrical machine 1 is capable of functioning as a motor that drives the driven device(s) connected to the output shaft 18.

Figure 5:
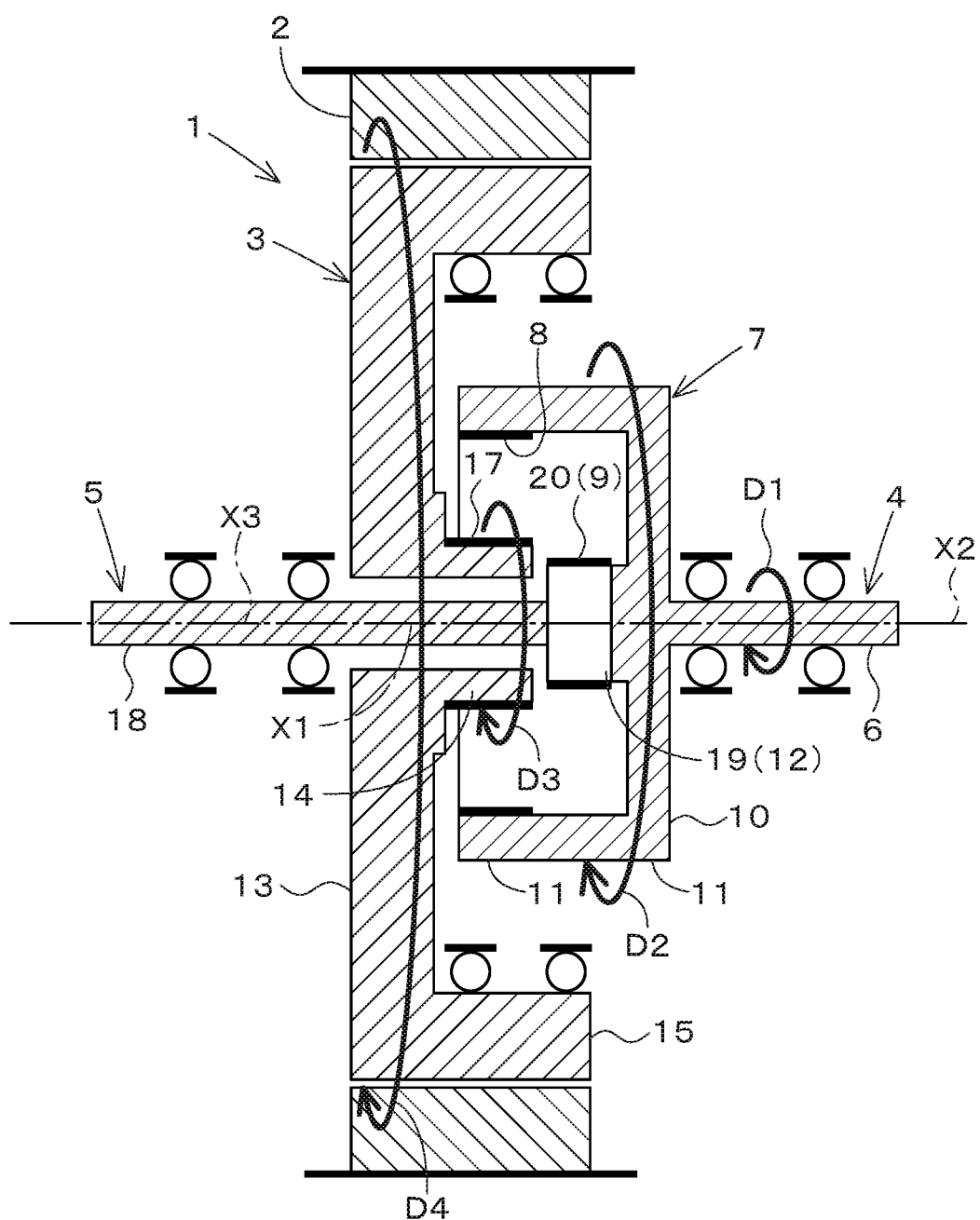
FIG. 5 illustrates operation performed in a case where the rotating electrical machine functions as a generator.
Figure 6:
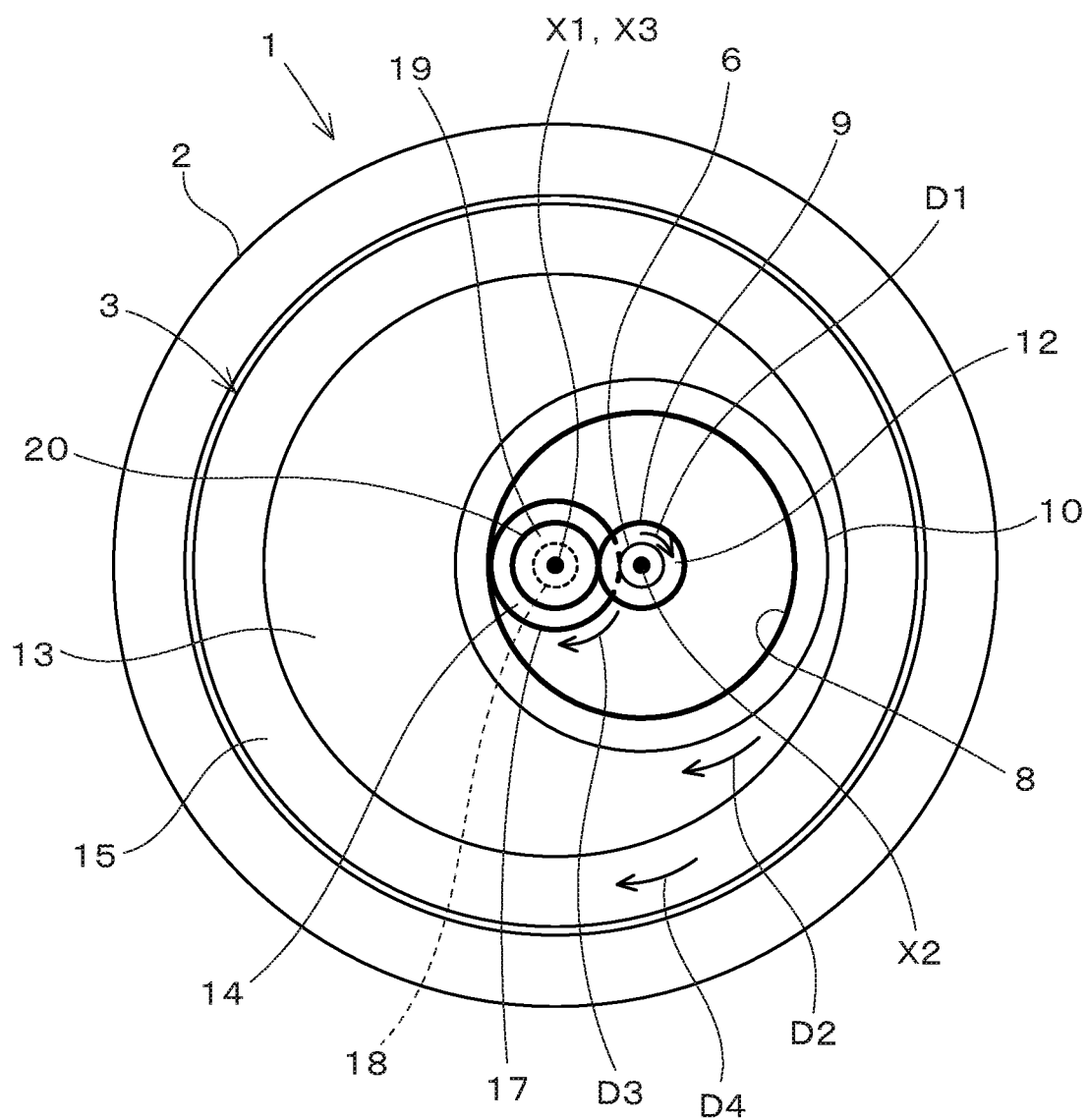
FIG. 6 illustrates operation performed in a case where the rotating electrical machine functions as a generator.

The rotating electrical machine 1 functions as a generator in which an electromotive force is generated in the coil(s) of the stator 2, when the rotor 3 rotates about the rotation axis X1 at a position radially inward of the stator 2. In this case, rotation power is inputted into the rotor 3 through the input shaft 6. As illustrated in FIGS. 5 and 6, as the input shaft 6 rotates (see arrow D1), the internally toothed gear portion 8 rotates (see arrow D2), and the boss portion 14 having the first external teeth 17 meshing with the internally toothed gear portion 8 rotates (see arrow D3). As the boss portion 14 rotates, the rotor 3 rotates (see arrow D4), and an electromotive force is generated in the coil(s) of the stator 2. The generated electromotive force is taken out through conducting wire(s) connected to the coil(s), and is then stored into, for example, a battery. Thus, the rotating electrical machine 1 is capable of functioning as a generator that generates an electromotive force.

In the rotating electrical machine 1, in a case where rotation power is inputted into the rotor 3 through the input shaft 6, the rotation power from the input shaft 6 is transmitted by the meshing of the internally toothed gear portion 8 of the input member 4 with the first external teeth 17 of the rotor 3. Therefore, it is possible to cause the rotor 3 to rotate at a higher speed than the input shaft 6. Therefore, it is possible to obtain output with high rotation speed while achieving a reduction in size of the rotating electrical machine 1. Moreover, since such high-speed rotation reduces the necessary amount of current and reduces heat generation, it is possible to improve the efficiency of the rotating electrical machine 1 and also reduce the size of a cooling device that cools the rotating electrical machine 1.

As described above, the rotating electrical machine 1 can be caused to function as a motor, can be caused to function as a generator, and can be caused to function as a motor/generator.

In a case where the rotating electrical machine 1 is caused to function as a motor/generator, it can be used for a parallel hybrid power transmission mechanism. In this case, the input shaft 6 rotates using power from a prime mover such as an engine. As the input shaft 6 rotates, the externally toothed gear portion 9 rotates, and the gear portion 19 having the second external teeth 20 meshing with the externally toothed gear portion 9 rotates. Due to the rotation of the gear portion 19, the output shaft 18 also rotates. Therefore, the driven device(s) (for example, hydraulic pump(s) and/or the like) connected to the output shaft 18 is/are driven. Furthermore, as the input shaft 6 rotates, the internally toothed gear portion 8 rotates, and the boss portion 14 having the first external teeth 17 meshing with the internally toothed gear portion 8 rotates. As the boss portion 14 rotates, the rotor 3 rotates, and an electromotive force is generated in the coil(s) of the stator 2. Electric power resulting from the electromotive force generated in the coil(s) is stored into the battery.

Figure 7:
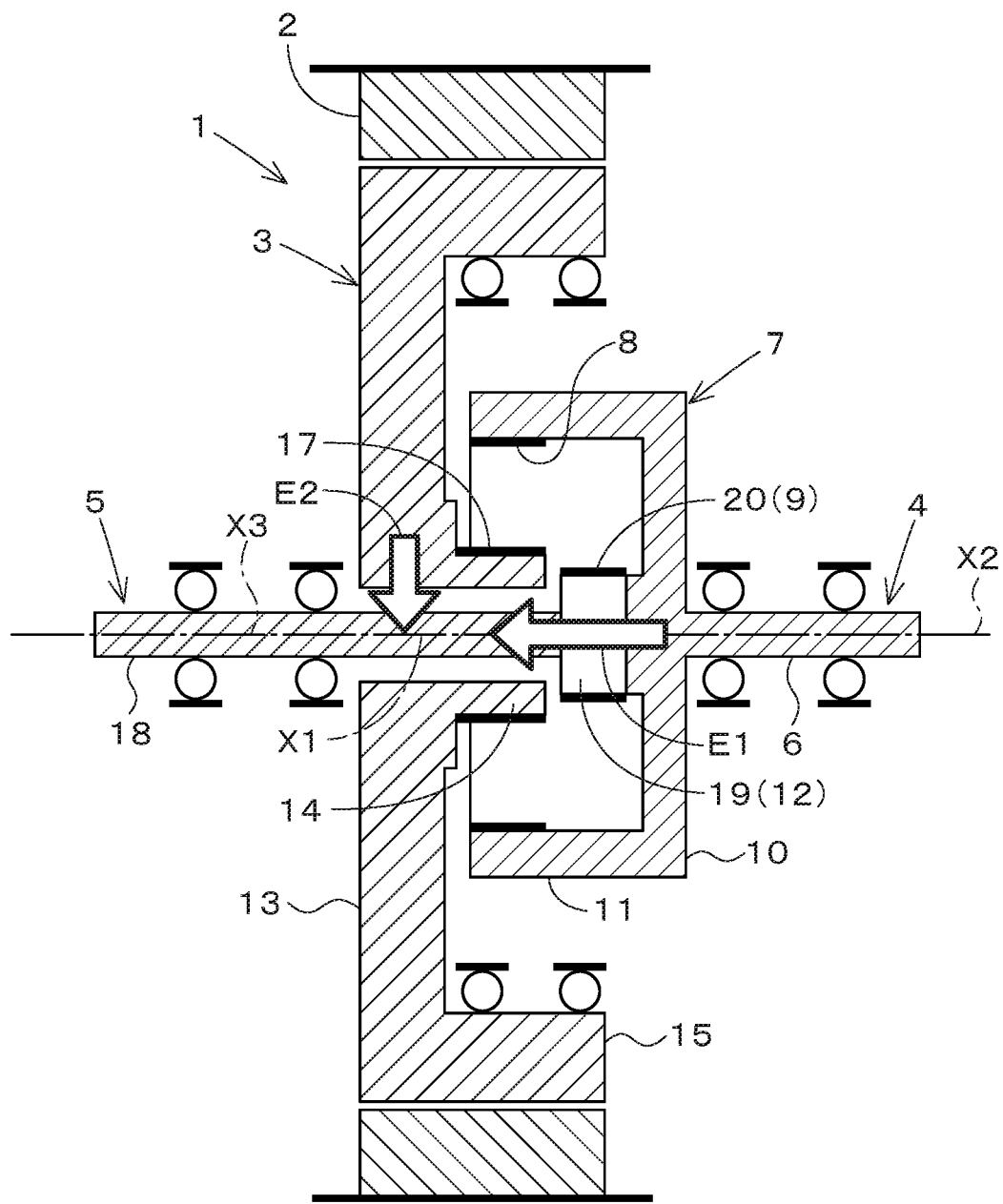
FIG. 7 illustrates power transmission performed in a case where the rotating electrical machine is used for a parallel hybrid power transmission mechanism.

Then, when the rotating electrical machine 1 is driven using the power stored in the battery in addition to being driven by the prime mover, the rotor 3 rotates, and the rotation power from the rotor 3 is transmitted through the first external teeth 17 to the internally toothed gear portion 8, and the externally toothed gear portion 9 rotates together with the internally toothed gear portion 8. As the externally toothed gear portion 9 rotates, the second external teeth 20 rotate, and the output shaft 18 rotates. That is, as illustrated in FIG. 7, the output shaft 18 rotates using power E1 from the prime mover which is inputted via the input shaft 6, and rotation power E2 from the rotor 3. In other words, using the rotation power E2 from the rotor 3, it is possible to assist the power E1 transmitted from the prime mover to the driven device(s) via the output shaft 18.

In a case where the rotating electrical machine 1 is used for a parallel hybrid power transmission mechanism as described above, since the input shaft 6 and the output shaft 18 extend in the front-rear direction in parallel to each other, a substantially in-line structure is obtained. This facilitates input into and output from the rotating electrical machine 1 and makes it possible to make the structure of the rotating electrical machine 1 compact.

In a case where the rotating electrical machine 1 is caused to function as a generator, it can also be used for a series hybrid power transmission mechanism. In this case, the input shaft 6 rotates using power from an engine or the like. As the input shaft 6 rotates, the rotor 3 rotates in the same manner (via the same actions) as in the case of the foregoing parallel hybrid power transmission mechanism, and an electromotive force is generated in the coil(s) of the stator 2. Electric power resulting from the electromotive force generated in the coil(s) is stored into the battery. The electric power stored in the battery is used to drive a motor provided separately from the rotating electrical machine 1, and the driven device(s) (for example, hydraulic pump(s) and/or the like) is/are driven by this motor.

Figure 8:
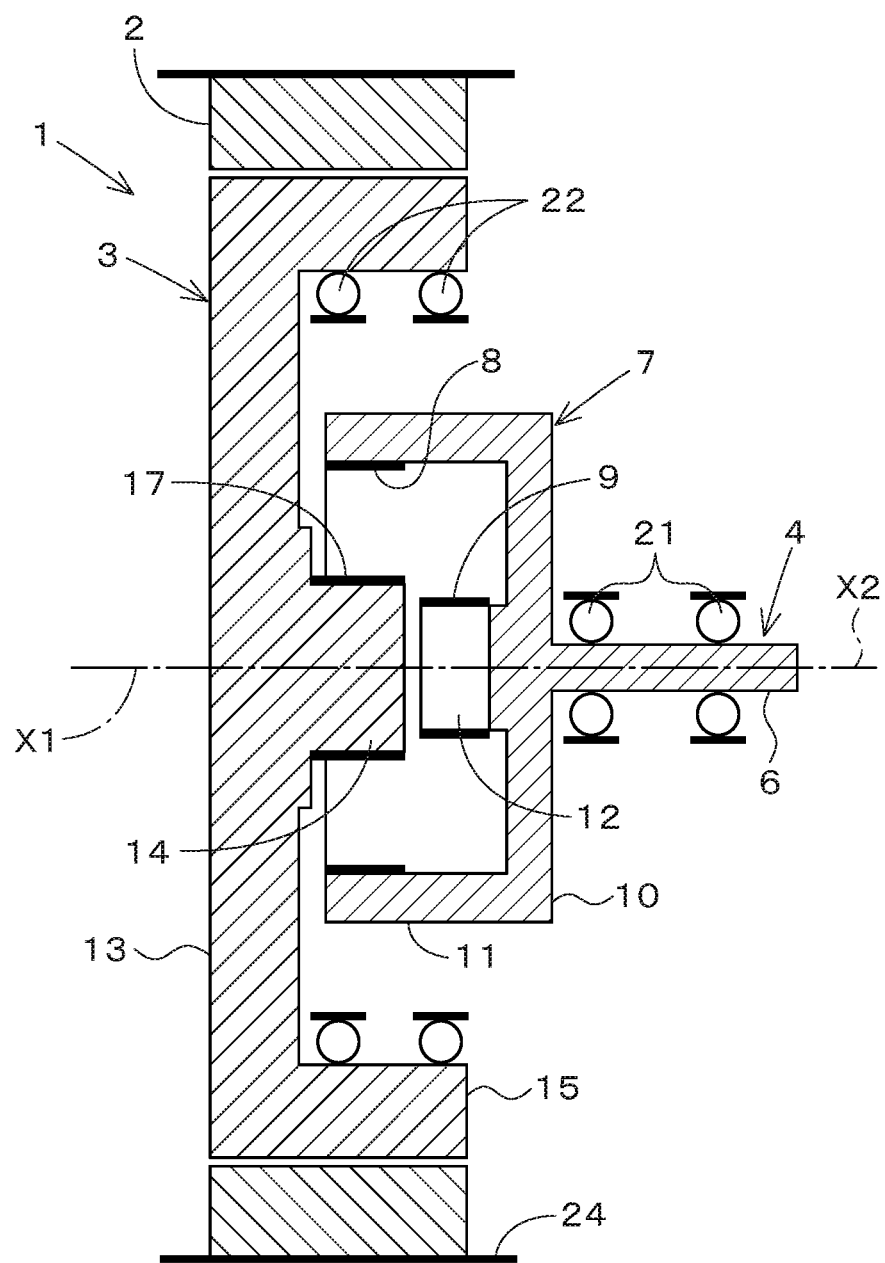
FIG. 8 is a cross-sectional view of a variation of the rotating electrical machine (in which an output shaft and the like are not illustrated).

In a case where the rotating electrical machine 1 is used for a series hybrid power transmission mechanism as described above, the output shaft 18 is unnecessary because the rotating electrical machine 1 needs only function as a generator without functioning as a motor. Therefore, as illustrated in FIG. 8, the rotating electrical machine 1 can have a configuration different from that of FIG. 1 in that the output member 5 including the output shaft 18, the third bearing 23, the gear portion 19 including the second external teeth 20, and the through hole 16 are not included. This makes it possible to make the structure of the rotating electrical machine 1 more compact. In particular, omitting the output shaft 18 makes it possible to reduce the dimension of the rotating electrical machine 1 in the front-rear direction and thus contributes significantly to achieving compactness. Omitting the output shaft 18, etc. is also advantageous in that the number of parts of the rotating electrical machine 1 can be reduced and the number of man hours for assembly can be reduced.

A rotating electrical machine 1 according to the above-described embodiments achieves the following effect(s).

A rotating electrical machine 1 includes a stator 2, a rotor 3 located radially inward of the stator 2 and being rotatable, and an input member 4 including an input shaft 6 through which rotation power is inputted into the rotor 3, wherein the input member 4 includes an internally toothed gear portion 8 to rotate as the input shaft 6 rotates, and the rotor 3 includes first external teeth 17 to mesh with the internally toothed gear portion 8.

This configuration makes it possible to provide a rotating electrical machine 1 that achieves compactness and high efficiency with a simple structure. More particularly, in a case where rotation power is inputted into the rotor 3 through the input shaft 6, the rotation power from the input shaft 6 is transmitted by the meshing of the internally toothed gear portion 8 with the first external teeth 17 of the rotor 3 and, therefore, it is possible to cause the rotor 3 to rotate at a higher speed than the input shaft 6. Therefore, it is possible to obtain output with high rotation speed while achieving a reduction in size of the rotating electrical machine 1. Moreover, since such high-speed rotation reduces the necessary amount of current and reduces heat generation, it is possible to improve the efficiency of the rotating electrical machine 1 and also reduce the size of a cooling device that cools the rotating electrical machine 1. Consequently, it is possible to achieve compactness and high efficiency of a power transmission mechanism using a rotating electrical machine such as a hybrid-type power transmission mechanism.

The rotating electrical machine 1 may include an output member 5 including an output shaft 18 through which rotation power is outputted from the rotor 3. The input member 4 may include an externally toothed gear portion 9 to rotate as the input shaft 6 rotates. The output member 5 may include second external teeth 20 to mesh with the externally toothed gear portion 9.

With this configuration, it is possible to cause the rotor 3 to rotate by the rotation power inputted through the input member 4 and to take out the rotation power from the rotor 3 through the output shaft 18 of the output member 5. Therefore, it is possible to cause the rotating electrical machine 1 to function as a motor/generator and to use the rotating electrical machine 1 for a parallel-hybrid power transmission mechanism to achieve compactness and high efficiency of the mechanism.

The first external teeth 17, the second external teeth 20, and the externally toothed gear portion 9 may be located radially inward of the internally toothed gear portion 8.

With this configuration, since the first external teeth 17, the second external teeth 20, and the externally toothed gear portion 9 are contained in a space radially inward of the internally toothed gear portion 8, it is possible to reduce the dimension of the rotating electrical machine 1 in the direction of the rotation axis of the rotor 3 (the dimension in the front-rear direction) and make the rotating electrical machine 1 compact.

The rotor 3 may include a base portion 13 having a disc shape, a boss portion 14 including the first external teeth 17, and an outer annular portion 15 located radially outward of the boss portion 14. The boss portion 14 and the outer annular portion 15 may protrude from the base portion 13 toward the input shaft 6. The internally toothed gear portion 8 may be located between the boss portion 14 and the outer annular portion 15.

With this configuration, since the boss portion 14 and the internally toothed gear portion 8 are contained in a space radially inward of the outer annular portion 15, it is possible to reduce the dimension of the rotating electrical machine 1 in the direction of the rotation axis of the rotor 3 (the dimension in the front-rear direction) and make the rotating electrical machine 1 compact.

The input member 4 may include the input shaft 6 and a power transmission portion 7. The power transmission portion 7 may include a substrate 10, an outer protruding portion 11, and a central protruding portion 12. One end portion of the input shaft 6 may be connected to a center of the substrate 10. The outer protruding portion 11 may have a cylindrical shape and extend from a peripheral portion of the substrate 10 toward the rotor 3. The internally toothed gear portion 8 may be located radially inward of the outer protruding portion 11. The central protruding portion 12 may extend from the center of the substrate 10 toward the rotor 3. The externally toothed gear portion 9 may be provided radially outward of the central protruding portion 12. The outer protruding portion 11 and the boss portion 14 may be arranged in a nested manner. The outer annular portion 15 and the outer protruding portion 11 may be arranged in a nested manner.

With this configuration, since the outer protruding portion 11 and the boss portion 14 are arranged in a nested manner and the outer annular portion 15 and the outer protruding portion 11 are arranged in a nested manner, it is possible to reduce the dimension of the rotating electrical machine 1 in the direction of the rotation axis of the rotor 3 (the dimension in the front-rear direction) and make the rotating electrical machine 1 compact, despite its simple structure without the need for a complex structure.

The output shaft 18 extends through the rotor 3.

With this configuration, since it is possible to place the axis X3 of the output shaft 18 on the same axis as the rotation axis X1 of the rotor 3, it is possible to reduce the diameter of the rotating electrical machine 1 and make the rotating electrical machine 1 compact.

A direction in which an axis X2 of the input shaft 6 extends may be not on the same axis as a direction in which an axis X3 of the output shaft 18 extends, but may be parallel to the direction in which the axis X3 of the output shaft 18 extends.

This configuration achieves easy input and output to and from the rotating electrical machine 1. In addition, this configuration makes the structure of the rotating electrical machine 1 compact.

The rotating electrical machine 1 may further include a bearing (second bearing 22) to support the rotor 3 rotatably. The bearing (second bearing 22) supports an inner circumferential surface of the outer annular portion 15.

With this configuration, since it is possible to place the bearing (second bearing 22) within the rotating electrical machine 1, it is possible to make the rotating electrical machine 1 compact.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotating electrical machine, comprising:
   a stator;
   a rotor located radially inward of the stator and being rotatable; and
   an input member including an input shaft through which rotation power is inputted into the rotor, wherein
   the input member includes an internally toothed gear portion to rotate as the input shaft rotates,
   the rotor includes first external teeth to mesh with the internally toothed gear portion, a base portion having a disc shape, a boss portion including the first external teeth, and an outer annular portion located radially outward of the boss portion,
   the boss portion and the outer annular portion protrude from the base portion toward the input shaft, and
   the internally toothed gear portion is located between the boss portion and the outer annular portion.

2. The rotating electrical machine according to claim 1, further comprising:
   an output member including an output shaft through which rotation power is outputted from the rotor, wherein
   the input member includes an externally toothed gear portion to rotate as the input shaft rotates, and
   the output member includes second external teeth to mesh with the externally toothed gear portion.

3. The rotating electrical machine according to claim 2, wherein
   the first external teeth, the second external teeth, and the externally toothed gear portion are located radially inward of the internally toothed gear portion.

4. The rotating electrical machine according to claim 2, wherein
   the input member includes the input shaft and a power transmission portion,
   the power transmission portion includes a substrate, an outer protruding portion, and a central protruding portion,
   one end portion of the input shaft is connected to a center of the substrate,
   the outer protruding portion has a cylindrical shape and extends from a peripheral portion of the substrate toward the rotor, and the internally toothed gear portion is located radially inward of the outer protruding portion,
   the central protruding portion extends from the center of the substrate toward the rotor, and the externally toothed gear portion is provided radially outward of the central protruding portion, and
   the outer protruding portion and the boss portion are arranged in a nested manner, and the outer annular portion and the outer protruding portion are arranged in a nested manner.

5. The rotating electrical machine according to claim 2, wherein
   the output shaft extends through the rotor.

6. The rotating electrical machine according to claim 2, wherein
   a direction in which an axis of the input shaft extends is not on the same axis as a direction in which an axis of the output shaft extends, but is parallel to the direction in which the axis of the output shaft extends.

7. The rotating electrical machine according to claim 1, further comprising:
   a bearing to support the rotor rotatably, wherein
   the bearing supports an inner circumferential surface of the outer annular portion.

* * * * *